US009020081B2

(12) United States Patent
Ichikawa

(10) Patent No.: US 9,020,081 B2
(45) Date of Patent: Apr. 28, 2015

(54) DIVERSITY CONTROL METHOD AND WIRELESS COMMUNICATION APPARATUS

(71) Applicant: Lapis Semiconductor Co., Ltd., Yokohama (JP)

(72) Inventor: Takeshi Ichikawa, Yokohama (JP)

(73) Assignee: Lapis Semiconductor Co., Ltd., Yokohama (JP)

( * ) Notice: Subject to any disclaimer, the term of this patent is extended or adjusted under 35 U.S.C. 154(b) by 147 days.

(21) Appl. No.: 13/923,947

(22) Filed: Jun. 21, 2013

(65) Prior Publication Data

US 2014/0003558 A1      Jan. 2, 2014

(30) Foreign Application Priority Data

Jun. 27, 2012   (JP) ................... 2012-144296

(51) Int. Cl.
   *H04B 7/10*    (2006.01)
   *H04L 7/04*    (2006.01)
   *H04B 7/08*    (2006.01)

(52) U.S. Cl.
   CPC .............. *H04L 7/042* (2013.01); *H04B 7/0808* (2013.01); *H04B 7/0811* (2013.01)

(58) Field of Classification Search
   CPC .. H04B 7/0802; H04B 7/0805; H04B 7/0808; H04B 7/0811; H04L 7/042
   USPC ..................... 375/343, 347; 455/277.1, 277.2
   See application file for complete search history.

(56) References Cited

U.S. PATENT DOCUMENTS

| 5,960,336 | A  | * | 9/1999  | Ikawa et al. ................. 455/277.2 |
| 2006/0133544 | A1 | * | 6/2006  | Kawada et al. ................. 375/343 |
| 2008/0279315 | A1 | * | 11/2008 | Sato ................................... 375/345 |
| 2008/0318541 | A1 | * | 12/2008 | Kimoto ....................... 455/277.1 |
| 2012/0114025 | A1 | * | 5/2012  | Gauthier ........................ 375/219 |

FOREIGN PATENT DOCUMENTS

JP     2000-286766     10/2000

* cited by examiner

*Primary Examiner* — David B. Lugo
(74) *Attorney, Agent, or Firm* — Volentine & Whitt, PLLC

(57) ABSTRACT

A diversity control method and a wireless communication apparatus which are capable of saving time and electricity consumed for diversity control if an approximation pattern approximating to a synchronization pattern appears in a reception signal during acquisition of the reception strength of every antenna by selecting any one of a plurality of antennas as a receiving antenna in every selection cycle, detection operation of a synchronization signal is continued regardless of the above described selection cycle.

16 Claims, 11 Drawing Sheets

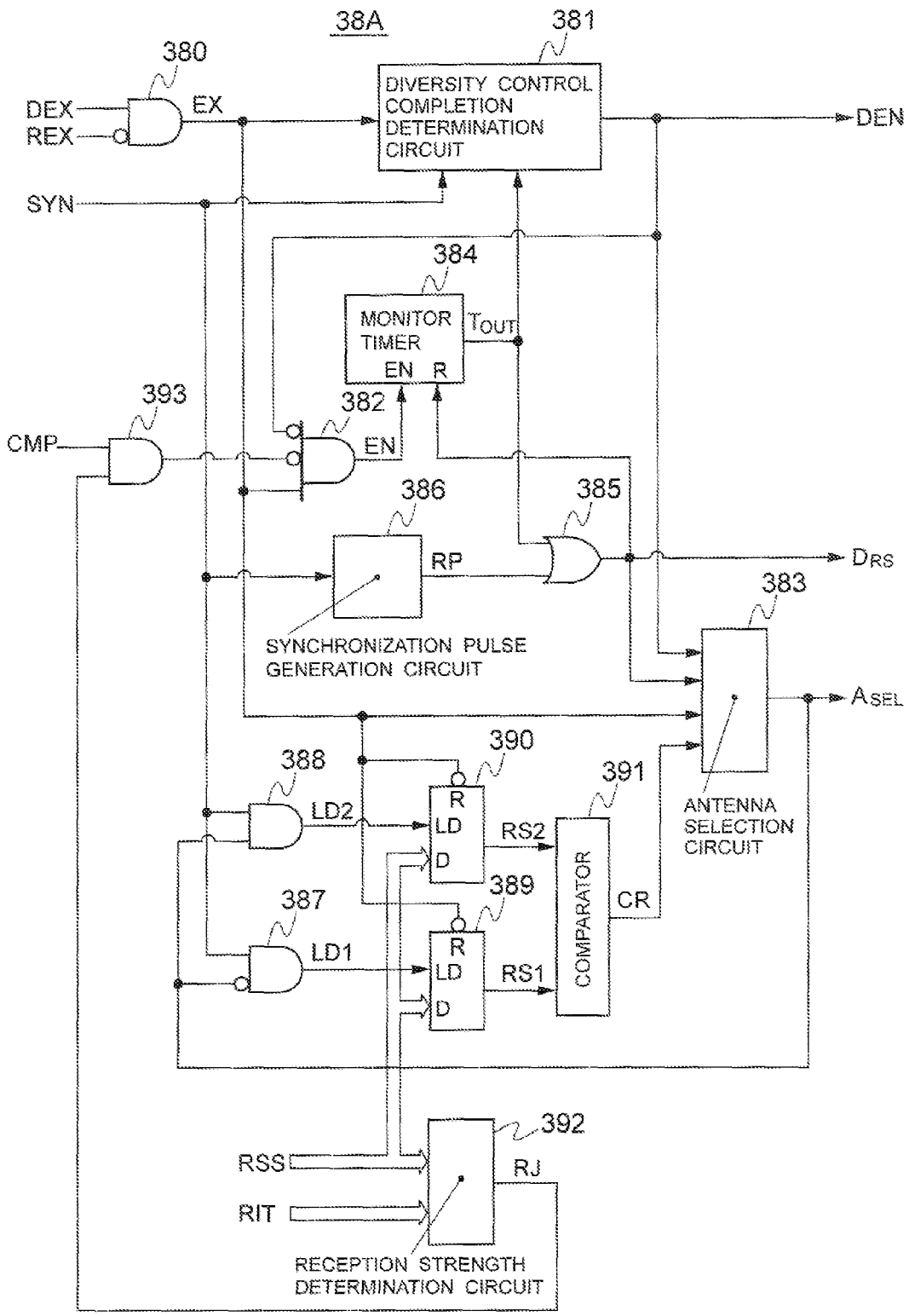

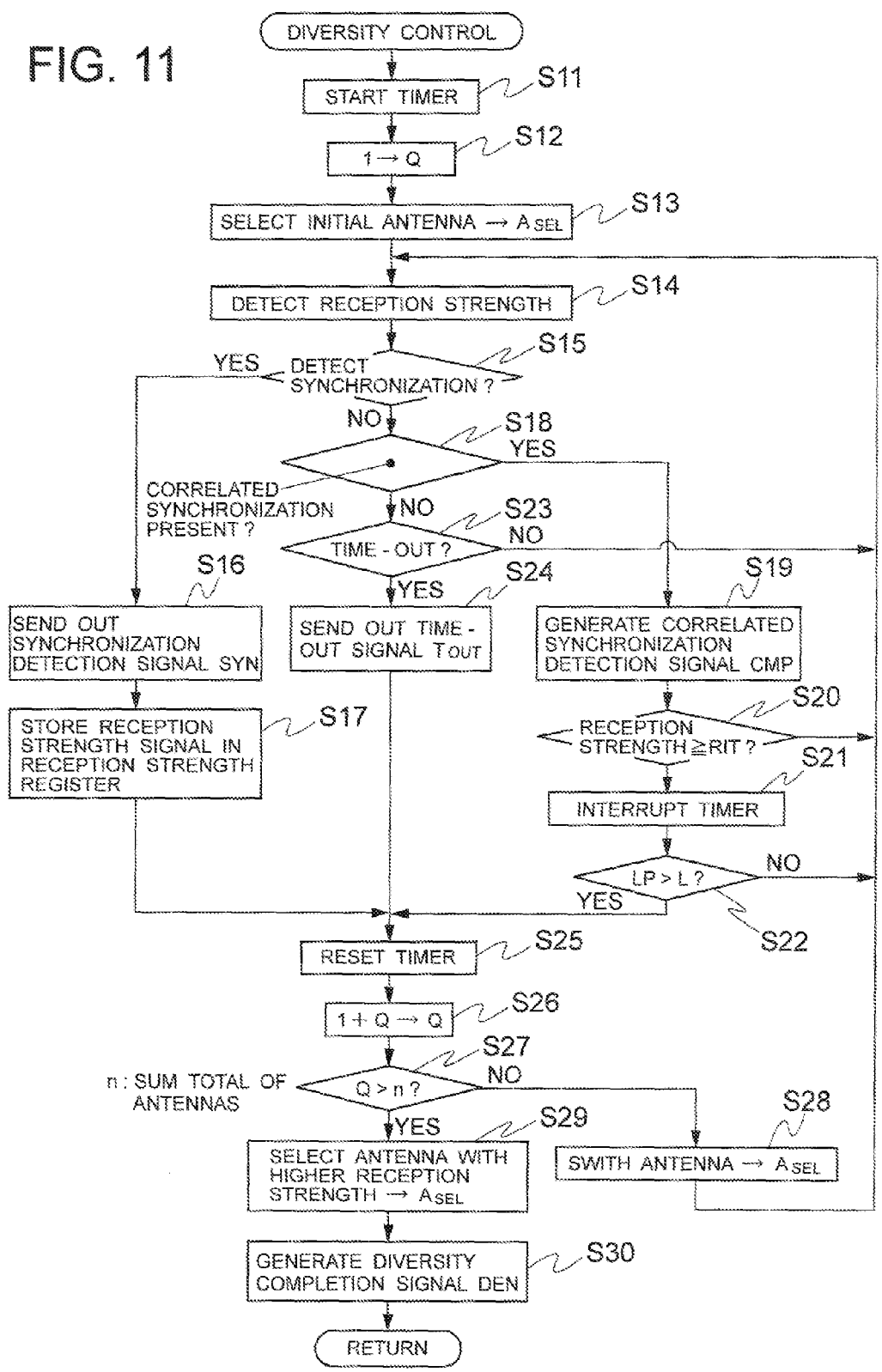

DIVERSITY CONTROL METHOD AND WIRELESS COMMUNICATION APPARATUS

BACKGROUND OF THE INVENTION

1. Field of the Invention

The present invention relates to a wireless communication apparatus, for instance, to a. diversity control method and a wireless communication apparatus of a diversity scheme for selecting, out of a plurality of antennas, one antenna which provides the most optimal receiving condition to perform data transmission and reception.

2. Description of the Related Art

There has been proposed a wireless communication apparatus of a diversity scheme which is configured to determine, out of respective antennas that receive data, synchronized antennas whose received data includes a preamble that matches a specified pattern within a fixed. time and to select, out of the synchronized antennas, the one having the highest reception strength as a final reception antenna see, for example, Japanese Patent Application Laid-Open No. 2000-286766), However, in the synchronization determination as described above, depending on receiving timings, receiving environments, and the like of the preamble, the apparatus may fail to recognize matching of the preamble of the received data with the specified pattern even though the received data can achieve synchronization in actuality. In this case, it is necessary to establish synchronization of a next candidate antenna once and then again perform synchronization processing of the antenna whose synchronization was previously failed. Accordingly, an unnecessarily long time is taken for reaching to a final antenna selection stage, and electricity consumption is disadvantageously increased by an amount corresponding to the processing time.

SUMMARY OF THE INVENTION

The present invention has been made to solve the above described problem, and it is an object of the present invention to provide a diversity control method and a wireless communication apparatus which are capable of suppressing time and electricity consumed for diversity control.

A diversity control method according to the present invention is a diversity control method for selecting any one of a plurality of antennas as a receiving antenna in every selection cycle, the method comprising: a reception. strength detection and retention step of alternatively selecting the antennas one by one while retaining reception strength data indicating a reception strength of a reception signal which is acquired in every antenna, the reception strength data in retained in association with each of the antennas in accordance with a detection timing of a synchronization signal in the reception signal; and a selection step of selecting an antenna corresponding to the receiving strength data, the reception strength detection and retention step including: a step of determining detection of the synchronization signal upon arrival of data that matches a synchronization pattern included in the reception signal; and a synchronization detection continuation step of continuing, if an approximation pattern approximating to the synchronization pattern is detected in the reception signal, detection operation of the synchronization signal regardless of the selection cycle.

A wireless communication apparatus according to the present invention is a wireless communication apparatus, including a diversity control part configured to select any one of a plurality of antennas as a receiving antenna in every selection cycle, the diversity control part comprising: an acquisition component which alternatively selects the antennas one by one in every selection cycle while acquiring a reception signal of each of the antennas; a reception strength detection component which generates reception strength data indicating reception strength of the reception signal; a synchronization detector for detecting the synchronization signal upon arrival of data that matches a synchronization pattern included in the reception signal and for sending out a synchronization detection signal; a reception strength register for retaining the reception strength data in association with each of the antennas in accordance with a timing of the synchronization detection signal in the reception signal; an optimal antenna selection component which selects an antenna on the basis of the reception strength data a correlated synchronization detector for sending out a correlated synchronization detection signal if an approximation pattern approximating to the synchronization pattern is detected in the reception signal; and a synchronization detection continuation component which continues detection operation of the synchronization signal in response to the correlated synchronization detection signal regardless of the selection cycle.

In the present invention, if an approximation pattern approximating to a synchronization pattern appears in a reception signal during acquisition of the reception strength of every antenna by selecting any one of a plurality of antennas as a receiving antenna in every selection cycle, then detection operation of a synchronization signal is continued regardless of the above described selection cycle. This makes it possible to solve the problem of occurrence of failure of acquisition of the reception strength due to the selected antenna being switched to a next antenna during detection processing of the synchronization pattern that can normally be detected.

Therefore, in the present invention, it is not. necessary to execute control for re-acquisition of the reception strength of an antenna whose reception strength. could not be acquired before. Accordingly, it becomes possible to achieve a shorter diversity control period and reduced electricity consumption.

BRIEF DESCRIPTION OF THE DRAWINGS

FIG. 10 is a circuit diagram showing an internal configuration of a diversity control part 38A; and FIG. 11 is a flow chart showing a diversity control routine according to a diversity control method in the present invention, the diversity control routine being executed by a CPU in response to a diversity execution instruction supplied from a system control part 30A.

DETAILED DESCRIPTION OF THE INVENTION

Figure 1:
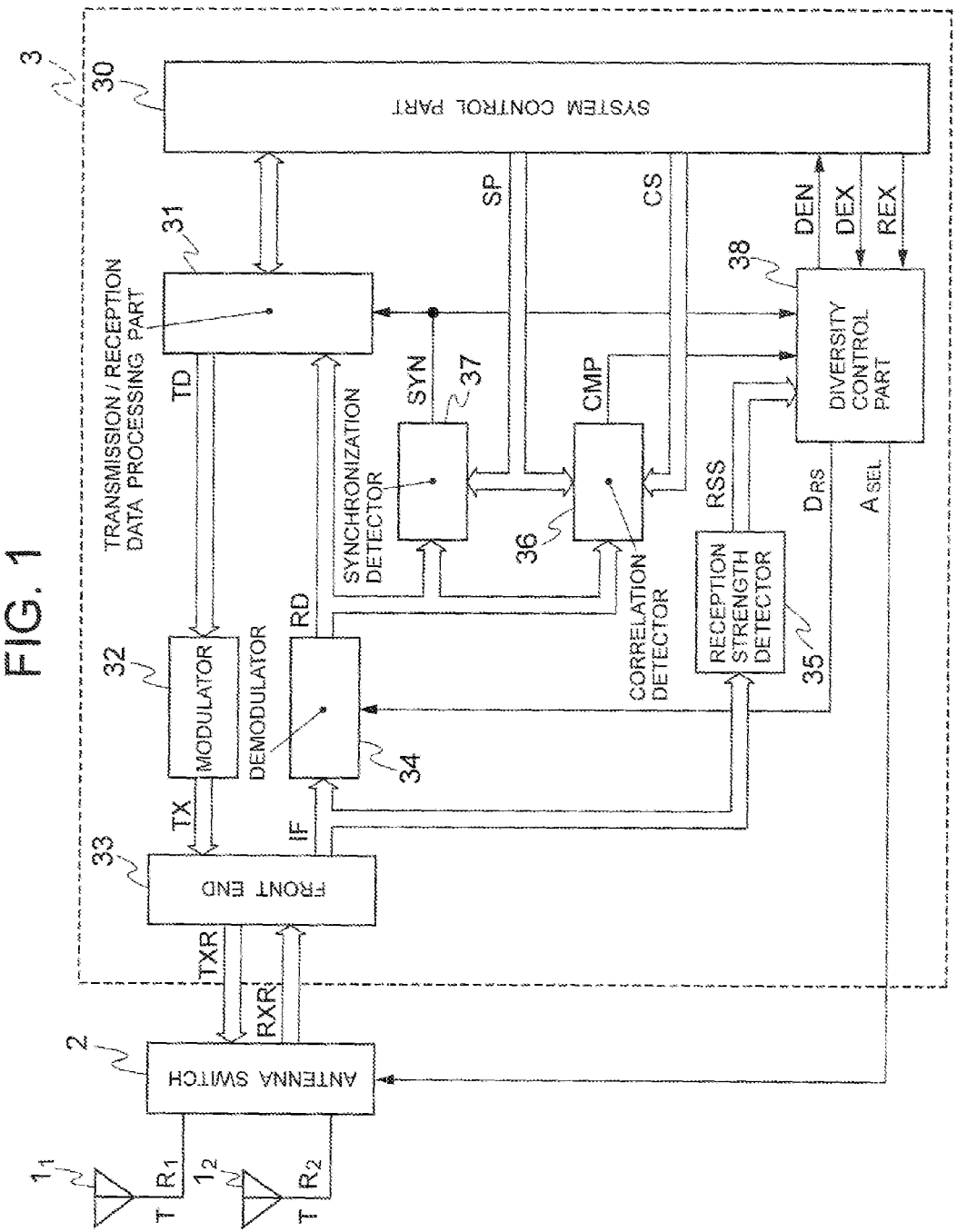
FIG. 1 is a block diagram showing a configuration of a wireless communication apparatus according to the present invention.

FIG. 1 is a block diagram showing the configuration of the wireless communication apparatus according to the present invention.

As shown in FIG. 1, the wireless communication apparatus has two antennas $1_1$ and $1_2$, which are placed in directions different from each other, an antenna switch 2, and a diversity transceiver 3.

The antenna $1_1$ supplies a reception signal $R_1$, which has been obtained by receiving a wirelessly transmitted electric wave, to the antenna switch 2. Conversely, when a transmission signal T is supplied via the antenna switch 2, the antenna $1_1$ emits an electromagnetic wave corresponding to the transmission signal T to the space.

The antenna $1_2$ supplies a reception signal $R_2$, which has been obtained by receiving a wirelessly transmitted electric wave, to the antenna switch 2. Conversely, when a transmission signal T is supplied via the antenna switch 2, the antenna In emits an electromagnetic wave corresponding to the transmission signal T to the space.

The antenna switch 2 selects, out of the antennas $1_1$ and $1_2$, one antenna for use in actual transmission and reception operation, in response to an antenna selection signal $A_{SEL}$ supplied from the diversity transceiver 3, and supplies a reception signal $R_1$ or $R_2$, which has been supplied from the selected antenna, to the diversity transceiver 3 as a reception signal RXR. For example, the antenna switch 2 selects, as the antenna for use in transmission and reception operation, the antenna $1_1$ when the antenna selection signal $A_{SEL}$ indicates logic level 0, and the antenna $1_2$ when the antenna selection signal $A_{SEL}$ indicates logic level 1.

When a transmission signal TXR is supplied from the diversity transceiver 3, the antenna switch 2 supplies the transmission signal TXR to the above-selected antenna as the transmission signal T.

The diversity transceiver 3 has a system control part 30, a transmission/reception data processing part 31, a modulator 32, a front end part 33, a demodulator 34, a reception strength detector 35, a correlation detector 36, a synchronization detector 37, and a diversity control part 38.

The system control part 30 supplies information data for transmission to the transmission/reception data processing part 31. The system control part 30 also supplies to the correlation detector 36 and the synchronization detector 37 synchronization pattern data SP indicating a synchronization pattern made of a bit sequence of N bits (N being an integer of 3 or larger) which should appear in a preamble of a transmission or reception signal. The system control part 30 also supplies to the correlation detector 36 a threshold, which is for determining whether or not correlation between the bit sequence in received data RD (described later) and the synchronization pattern data SP is high, i.e., for determining whether or not the bit sequence approximates to the synchronization pattern. data SP. The threshold is, for example, a correlation threshold CS which indicates the number of minimum bits "K" (K being an integer smaller than N) which need to be matched. The system control part 30 supplies a reception instruction signal REX of logic level 1, which prompts receiving, operation, to the respective modules (31 to 37) including the diversity control part 38. The system control part 30 further supplies to the diversity control part 38 a diversity execution instruction signal DEX of logic level 1 that instructs execution of diversity control after a predetermined period of time from supply of a diversity completion signal DEN from the diversity control part 38.

The transmission/reception data processing part 31 adds a synchronization pattern to the information data for transmission which has been supplied from the system control part 30 and subjects the data to error correction coding, and supplies the data as transmission data TD to the modulator 32. When received data RD is supplied from the demodulator 34, the transmission/reception data processing part 31 detects and corrects error in the received data RD, and supplies the data, as reception information data, to the system control part 30 at the timing in accordance with a synchronization detection signal SYN (described later) supplied from the synchronization detector 37.

The modulator 32 performs specified modulation processing, such as FSK (Frequency shift keying) modulation, on the transmission data TD, and supplies the resultant data as modulated transmission data TX to the front end part 33.

The front end part 33 converts the modulated transmission data TX into a high frequency signal of a specified radio communication band, and supplies the converted signal as a transmission signal TXR to the antenna switch 2. The front end part 33 also converts a reception signal RXR supplied from the antenna switch 2 into an intermediate frequency signal IF of an intermediate frequency band, and supplies the converted signal to the demodulator 34 and the reception strength detector 35.

The reception strength detector 35 detects the strength of the reception signal on the basis of an amplitude of the intermediate frequency signal IF, and supplies reception strength data RSS, which indicates the strength, to the diversity control part 38.

The demodulator 34 performs specified demodulation processing, such as FSK demodulation processing, on the intermediate frequency signal IF to generate received data RD in the form of a digital signal, and also generates a demodulation clock signal CLK synchronized with a bit sequence the received data RD. These data RD and signal CLK are supplied to each of the transmission/reception data processing part 31, the correlation detector 36, and the synchronization detector 37. When a diversity reset signal $D_{RS}$ is supplied from the diversity control part 38, the demodulator 34 initializes the acquired received data RD together with values generated in every stage of the above described demodulation processing.

Figure 2:
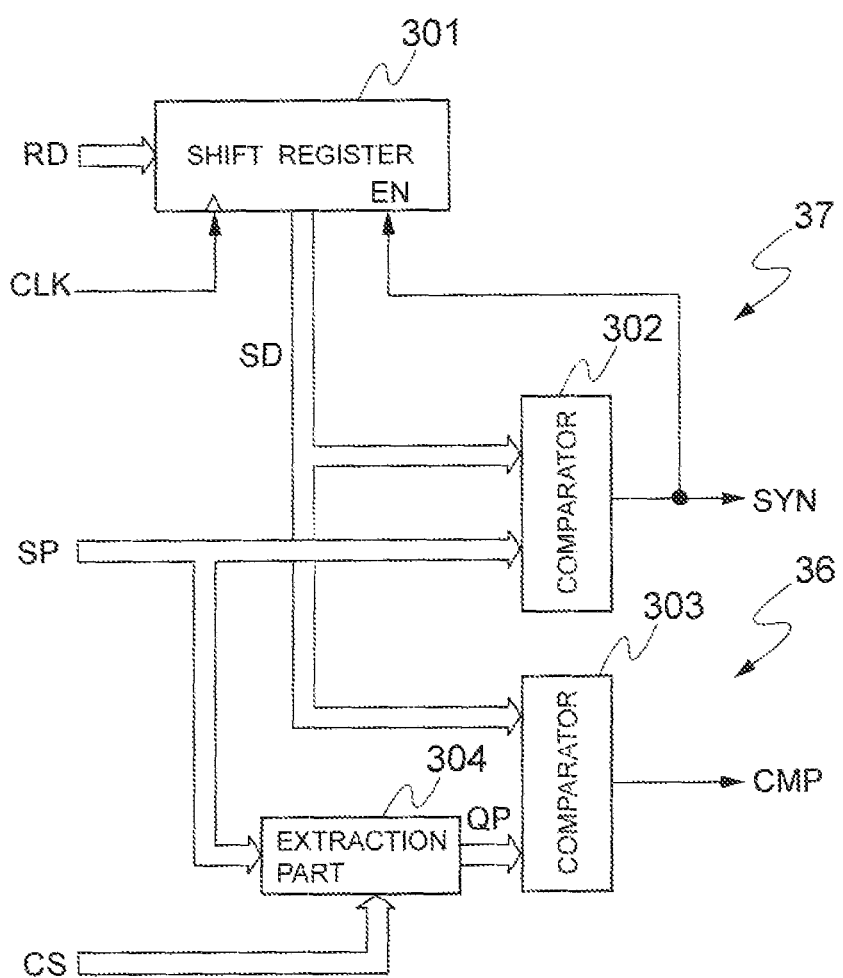
FIG. 2 is a block diagram showing an internal configuration of a correlation detector 36 and a synchronization detector 37.

FIG. 2 is a block diagram showing the internal configuration of the correlation detector 36 and the synchronization detector 37.

In FIG. 2, the synchronization detector 37 includes a shift register 301 and a comparator 302, while the correlation detector 36 includes the shift register 301, a comparator 303, and an extraction part 304.

The shift register 301 is activated only while the synchronization detection signal SYN is in the state of logic level 0 which indicates non-detection of synchronization. In this case, the shift register 301 sequentially fetches a data bit sequence of the received data RD according to the demodulation clock signal CLK, and supplies the fetched bit sequence to the comparators 302 and 303 as shift received data SD, each made of the number of bits of the synchronization pattern, e.g., each made of 8 bits.

The comparator 302 compares the above described shift received data SD and the synchronization pattern data SP to determine whether or not they match each other. More specifically, the comparator 302 determines whether or not the shift received data SD includes a bit sequence which matches the bit sequence shown by the synchronization pattern data SP. If they match each other, the comparator 302 generates a synchronization detection signal SYN of logic level 1 which indicates detection of synchronization, whereas if they do no match each other, the comparator 302 generates a synchronization detection signal SYN of logic level 0 which indicates non-detection of synchronization.

According to the above described configuration, the synchronization detector 37 which is made of the shift register 301 and the comparator 302 supplies, to each of the shift register 301, the transmission/reception data processing part 31, and the diversity control part 38, a synchronization detection signal SYN of logic level 1 which indicates detection of synchronization when the received data RD includes the same bit sequence as that in the synchronization pattern data SP, and supplies a synchronization detection signal SYN of logic level 0 which indicates non-detection of synchronization when the received data RD does not includes the bit sequence.

The extraction part 304 extracts from the synchronization pattern data SP a hit sequence of K bits indicated by the above described correlation threshold CS, and supplies extracted synchronization pattern QP, which represents the extracted bit sequence, to the comparator 303.

The comparator 303 compares the above described shift received data SD and the extracted synchronization pattern. QP to determine whether or not they match each other. More specifically, the comparator 303 determines whether or not the shift received data SD includes a bit sequence which matches the bit sequence shown by the extracted synchronization pattern QP. If the bit sequences match each other, the comparator 303 generates a correlated synchronization detection signal CMP of logic level 1 which indicates presence of correlated synchronization, whereas if the bit sequences do not match each other, the comparator 303 generates a correlated synchronization detection signal CMP of logic level 0 which indicates absence of correlated synchronization. In short, by determining whether or not part of the top bit sequence in the synchronization pattern data SP matches the received data RD, the comparator 303 determines whether or not a pattern with high correlation with the synchronization pattern data SE is present in the received data RD.

In other words, the correlation detector 36 determines whether or not a reception signal (RD) includes an approximation pattern approximating to the synchronization pattern data SP.

According to the above described configuration, the correlation detector 36 which includes the shift register 301, the comparator 303, and the extraction part 304, supplies to the diversity control part 38 a correlated synchronization detection signal CMP of logic level 1 which indicates presence of correlated synchronization when the bit sequence with high correlation with the synchronization pattern data SP is present in the received data RD, and supplies a correlated synchronization detection signal CMP of logic level 0 which indicates absence of correlated synchronization when the bit sequence is not present. More specifically, the correlation detector 36 generates a correlated synchronization detection signal CMP of logic level 1 when the received data RD includes an approximation pattern approximating to the synchronization pattern data SP and a correlated synchronization detection signal CMP of logic level 0 when the received data RD does not include the approximation pattern, and supplies the generated signal CMP to the diversity control part 38.

Figure 3:
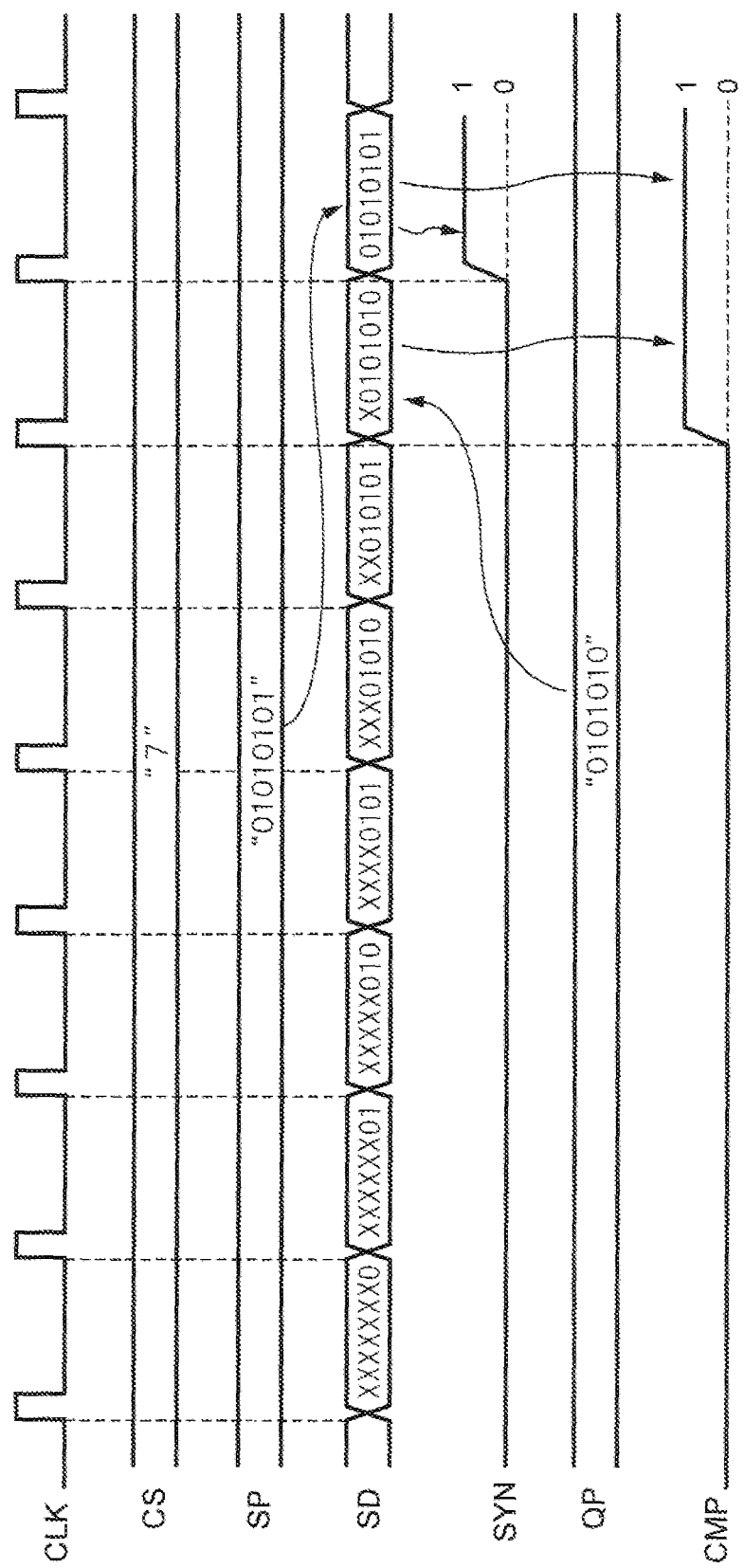
FIG. 3 is a time chart showing one example of an operation of the correlation detector 36 and the synchronization detector 37.

FIG. 3 is a time chart showing one example or an operation of the correlation detector 36 and the synchronization detector 37.

Note that FIG. 3 shows an operation in the case where the synchronization pattern which appears in the preamble of a transmission or reception signal is, for example, a bit sequence of 8 bits [01010101], and a value K, which is the number of bits indicated by the correlation threshold CS, is 7. More specifically, the system control part 30 supplies synchronization pattern data SP indicating a bit sequence of 8 bits [0101010] to each of the correlation detector 36 and the synchronization detector 37, and also supplies a correlation threshold CS, which is 7 bits, to the correlation detector 36. In this case, the extraction part 304 in the correlation detector 36 extracts a bit sequence of top 7 bits [0101010] from the synchronization pattern data SP, and supplies the extracted bit sequence as extracted synchronization pattern QP to the comparator 303 in the correlation detector 36.

Here, if a bit sequence of an 8-bit synchronization pattern [01010101] appears in the received data RD in a serial form, one bit at a time, in synchronization with the demodulation clock signal CLK, the shift register 301 supplies, to the comparators 302 and 303, shift received data SD, which is each made of 8 bits and is shifted as shown in FIG. 3.

In this case, the comparator 302 as the synchronization detector 37 outputs a synchronization detection signal SYN which shifts from the state of logic level 0 to the state of logic level 1 when the shift received data SD completely matches the bit sequence of 8 bits [01010101] indicated by the synchronization pattern. data SP.

Contrary to this, the comparator 303 as the correlation detector 36 outputs a correlated synchronization detection signal CMP which shifts from the state of logic level 0 to the state of logic level 1 when the shift received data SD matches the hit sequence of 7 bits [0101010] shown in the extracted synchronization pattern data QP. Therefore, as shown in FIG. 3, the correlated synchronization detection signal CMP is generated so as to shift to the state of logic level 1 at an earlier stage than the synchronization detection signal SYN.

The diversity control part 38 executes diversity control which instructs selection of one antenna which is to have an optimal receiving condition, out of the antennas $1_1$ and $1_2$, on the basis of the above described reception strength data RSS, correlated synchronization detection. signal CMP, synchronization detection signal SYN, diversity execution instruction signal DEX, and reception instruction signal REX. The diversity control part 38 supplies an antenna selection signal $A_{SEL}$ generated by such diversity control to the antenna switch 2.

Figure 4:
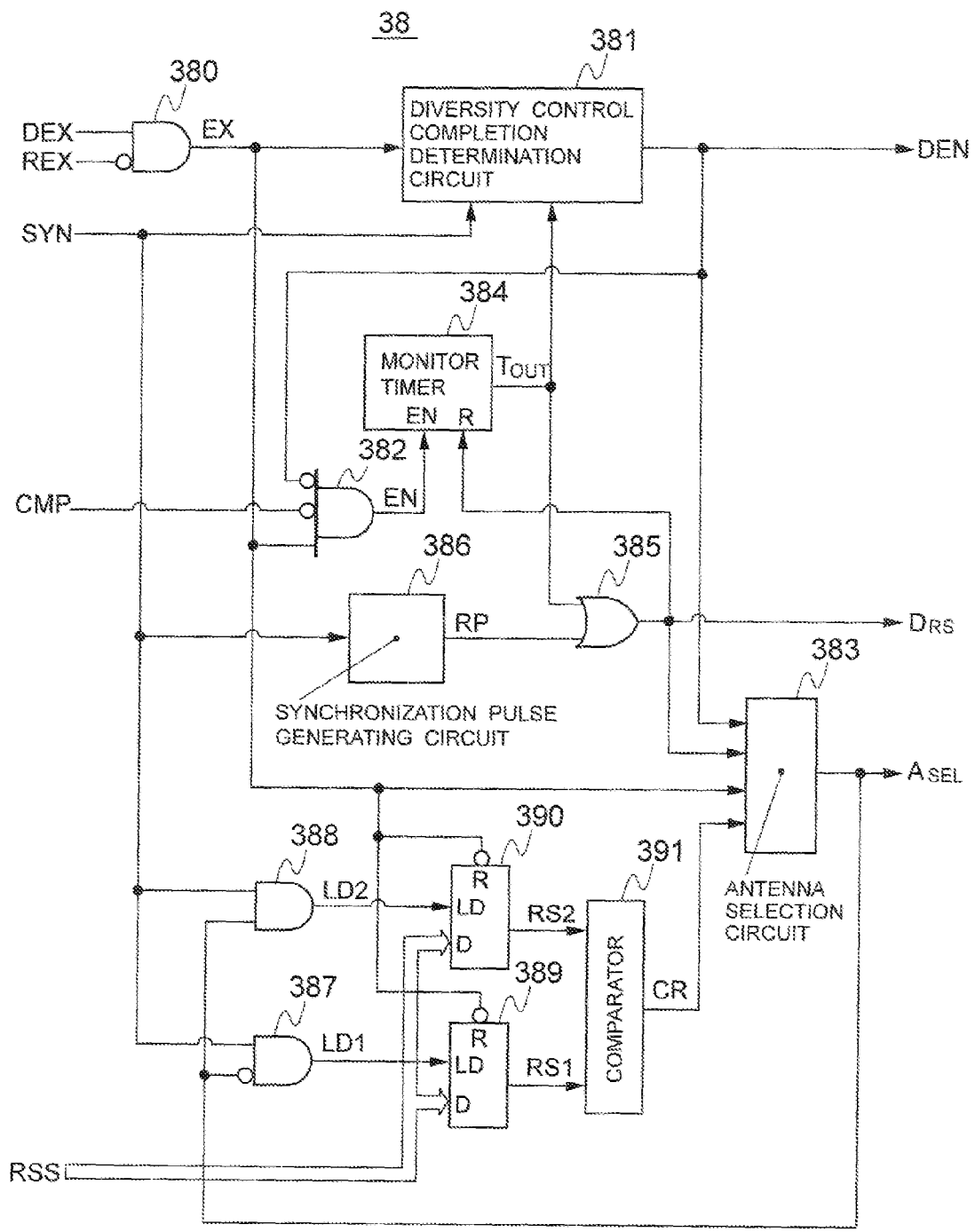
FIG. 4 is a circuit diagram showing an internal configuration of a diversity control part 38.

FIG. 4 is a circuit diagram showing an internal configuration of the above described diversity control part 38.

In FIG. 4, only when the system control part 30 supplies a diversity execution instruction signal DEX of logic level 1, which instructs execution of diversity control, and a reception signal REX of logic level 1, which prompts receiving operation, an AND gate 380 generates a diversity execution signal EX of logic level 1 which instructs execution of diversity control. In other cases, the AND gate 380 generates a diversity execution signal EX of logic level 0. The AND gate 380 supplies such a diversity execution signal EX to a diversity control completion determination circuit 381, an AND gate 382, an antenna selection circuit 383, and reception strength registers 389 and 390.

In the case where the diversity execution signal EX shifts from logic level 0 to logic level 1, and then the synchronization detection signal SYN of logic level 1 which indicates detection of synchronization is supplied total two times, the diversity control completion determination circuit 381 generates a diversity completion signal DEN of logic level 1 which indicates completion of the diversity control. In other cases, the diversity control completion determination circuit 381 generates a diversity completion signal DEN of logic level 0 which indicates noncompletion of diversity control. More specifically, if the synchronization detection signal SYN of logic level 1 is supplied for every antenna ($1_1$, $1_2$) that is a target of diversity control, then the diversity control completion determination circuit 381 generates a diversity completion signal DEN of logic level 1 which indicates completion of diversity control. Furthermore, in the case where the diversity execution signal EX shifts from logic level 0 to logic level 1 and then a time-out signal $T_{out}$ of logic level 1 which indicates time-out is supplied total two times from a later-described monitor timer 384, the diversity control completion determination circuit 381 generates a diversity completion signal DEN of logic level 1 which indicates completion of diversity control. In other cases, the diversity control completion determination circuit 381 generates a diversity completion signal DEN of logic level 0 which indicates noncompletion of diversity control. The diversity control completion determination circuit 381 supplies such a diversity completion signal DEN to the AND gate 382, the antenna selection circuit 383, and the system control part 30.

Only when the correlated synchronization detection signal CMP is at logic level 0 which indicates absence of correlated synchronization, the diversity execution signal EX is at logic level 1 which indicates execution of diversity control, and the diversity completion signal DEN is at logic level 0 which indicates noncompletion of diversity control, the AND gate 382 generates a count activity signal EN of logic level 1 which instructs activation of a count operation. In other cases, the AND gate 382 generates a count activity signal EN of logic. level 0 which inactivates the count operation. The AND gate 382 supplies such a count activity signal EN to the monitor timer 384.

While the count activity signal EN is in the state of logic level 1, the monitor timer 384 counts the pulse number of a system clock signal not shown), whereas while the count activity signal EN of logic level 0 is being supplied, the monitor timer 384 stops the count operation. In this case, the monitor timer 384 generates a time-out signal $T_{OUT}$ of logic level 0 while the counted value is smaller than a specified time out value $T_{UP}$. Once the present counted value reaches the time out value $T_{UP}$, the monitor timer 384 generates a time-out signal $T_{OUT}$ of logic level 1 which indicates time-out, and supplies it to the diversity control completion determination circuit 381 and an OR gate 385. Note that the monitor timer 384 resets the present counted value to 0 immediately after the above described time-out or upon supply of a diversity reset signal $D_{RS}$ described later) of logic level 1.

In response to the synchronization detection signal SYN of logic level 1, a synchronization pulse generation circuit 386 generates a synchronization pulse signal RP of logic level 1 which is in synchronization with the system, clock signal, and supplies it to the OR gate 385.

When the time-out signal $T_{OUT}$ or the synchronization pulse signal RP is at logic level 1, the OR gate 385 supplies a diversity reset signal $D_{RS}$ of logic level 1, which notifies restart of diversity control, to the antenna selection circuit 383 and the demodulator 34.

Only when the antenna selection signal $A_{SEL}$ is at logic level 0 which indicates selection of the antenna $1_1$, and the synchronization detection signal SYN is at logic level 1 which indicates detection of synchronization, the AND gate 387 supplies a reception strength retaining signal LD1 of logic level 1, which instructs fetch of reception strength data RSS, to the reception strength register 389. The reception strength register 389 fetches a value of the above described reception strength data as only when the reception strength retaining signal LD1 is at logic level 1. The reception strength register 339 then retains the fetched value of the reception strength data RSS, and also supplies the value to a comparator 391 as an antenna reception strength RS1 which indicates the reception strength of the antenna $1_1$. When the diversity execution signal EX is at logic level 0, the reception strength register 389 resets the value of the reception strength data RSS, which has been fetched as described in the foregoing, to 0.

Only when the antenna selection signal $A_{SEL}$ is at logic level 1 which indicates selection of the antenna $1_2$, and the synchronization detection signal SYN is at logic level 1 which indicates detection of synchronization, the AND gate 388 supplies to the reception strength, register 390 a reception strength retaining signal LD2 of logic level 1 which instructs fetch of reception strength data RSS. The reception strength register 390 fetches a value of the above described reception strength data RSS only when the reception strength retaining signal LD2 is at logic level 1. The reception strength register 390 retains the fetched value of the reception strength data RSS, and also supplies the value to the comparator 391 as an antenna reception strength RS2 which indicates the reception strength in the antenna $1_2$. When the diversity execution signal EX is at logic level 0, the reception strength register 390 resets the value of the reception strength data RSS, which has been fetched as described in the foregoing, to 0.

The comparator 391 performs size comparison between the antenna reception strength RS1 and the antenna reception strength RS2, and supplies to the antenna selection circuit 383 a reception strength comparison result signal CR of logic level 0 if RS1 is equal to or larger than RS2 and a reception strength comparison result signal CR of logic level 1 if RS1 is smaller than RS2.

If the reception strength comparison result signal CR indicates logic level 0, the antenna selection circuit 383 generates an antenna selection signal $A_{SEL}$ of logic level 0 which instructs selection of the antenna $1_1$. If the reception strength comparison result signal CR indicates logic level 1, the antenna selection circuit 383 generates an antenna selection signal $A_{SEL}$ of logic level 1 which instructs selection of the antenna 12.

Note that immediately after the diversity execution signal EX shifts from logic level 0 to logic level 1, the antenna selection circuit 383 generates an antenna selection signal $A_{SEL}$ of logic level 0, which instructs selection of the antenna $1_1$ by default, regardless of the value of the reception strength comparison result signal CR. Then, once a diversity reset signal DRS of logic level 1 which notifies restart of diversity control is supplied, the antenna selection circuit 383 inverts the logic level of the antenna selection signal $A_{SEL}$. More specifically, when a time-out signal $T_{OUT}$ which indicates time-out is sent out from the monitor timer 384, or when a synchronization detection signal SYN which indicates detection of synchronization is sent out from the synchronization detector 37, the antenna selection circuit 383 generates an antenna selection signal $A_{SEL}$ which instructs to switch a selection target from one antenna to another antenna. Furthermore, at the moment when a diversity completion signal DEN of logic level 1 which indicates completion of diversity control is supplied, the antenna selection circuit 383 retains the details of the reception strength comparison result signal CR supplied from the comparator 391. That is, immediately after the diversity completion signal DEN of logic level 1 is supplied, the antenna selection circuit 383 starts to continuously generate the antenna selection signal $A_{SEL}$ which instructs selection of the antenna indicated by the retained reception strength comparison result signal CR.

The antenna selection circuit 383 supplies the thus—generated antenna selection signal $A_{SEL}$ to the AND gates 387 and 388 as well as to the antenna switch 2.

Hereinbelow, a description will be given of the above described diversity control performed in the wireless communication apparatus in two different cases, that is, in the first case where synchronization is normally established in both the antennas $1_1$ and $1_2$ at the first attempt and in the second case where synchronization is not established on the antenna $1_1$ side.

Figure 5:
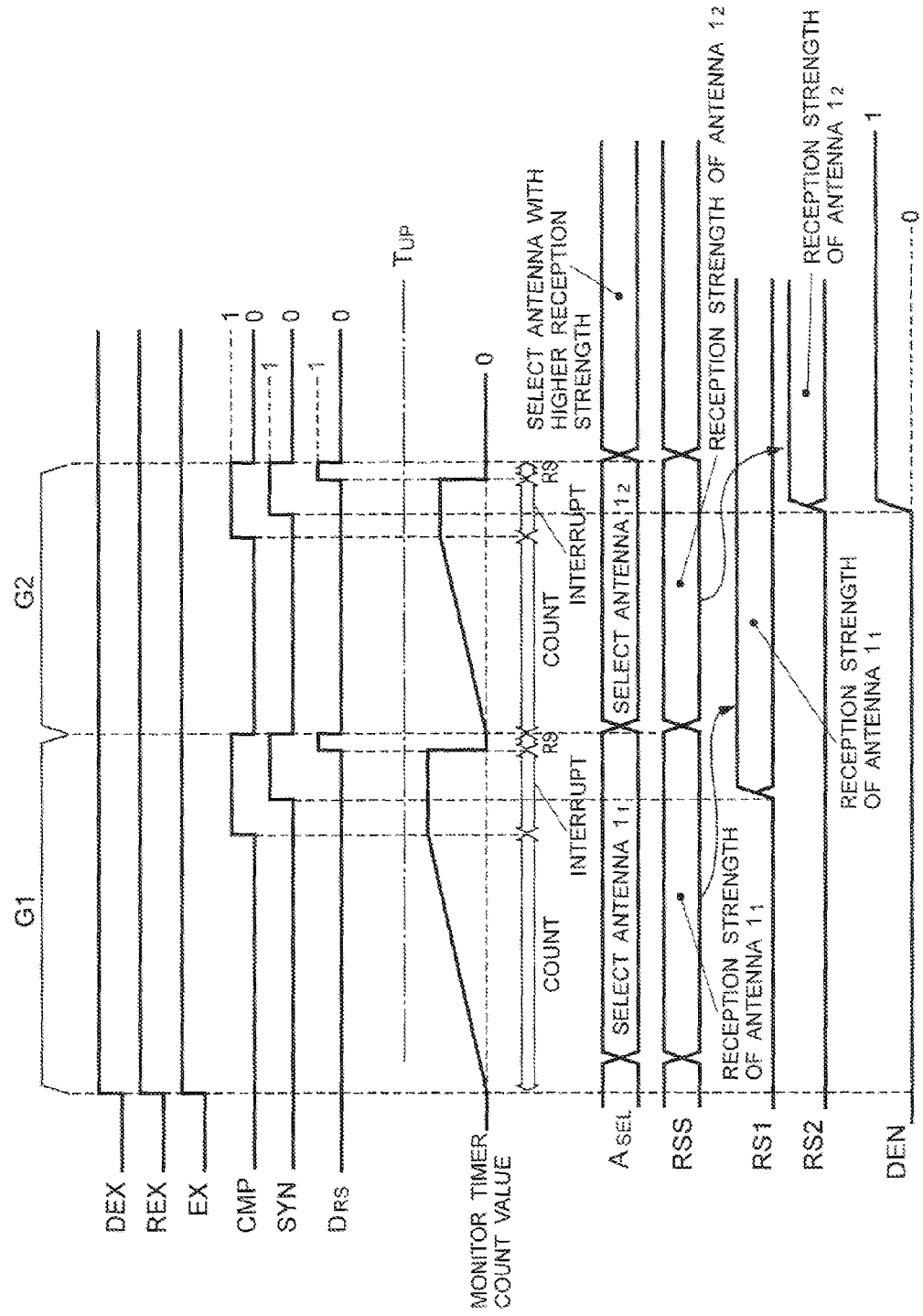
FIG. 5 is a time chart showing one example of a diversity operation in the case where synchronization can normally be established in the first attempt in each of antennas $1_1$ and $1_2$.

(1) The case where synchronization is normally established both in the antennas $1_1$ and $1_2$ in the first attempt First, the system control part 30 supplies a diversity execution instruction signal DEX and a reception instruction signal REX, each of which shifts from the state of logic level 0 to the state of logic level 1, to the diversity control part 38 as shown in FIG. 5. Consequently, the diversity execution signal EX of logic level 1 is supplied to the AND gate 382, and the monitor timer 384 starts the count-up operation. Further, the antenna selection circuit 383 supplies an antenna selection signal $A_{SEL}$ of logic level 0, which instructs selection of antenna $1_1$ by default, to the antenna switch 2 and the AND gates 387 and 388. As a consequence, the received data RD obtained by receiving in the antenna $1_1$ is supplied to the shift register 301 of the correlation detector 36 and the synchronization detector 37 as shown. in FIG. 2 In this case, if a synchronization pattern identical to the bit sequence shown in the synchronization pattern data SP appears in the received data RD before the counted value of the monitor timer 384 reaches a time out value $T_{UP}$ as shown in FIG. 5, the correlation detector 36 sends out a correlated synchronization detection signal CMP of logic level 1 immediately before that point, and then the synchronization detector 3 sends out a synchronization detection signal SYN of logic level 1 in succession response to the synchronization detection signal SYN of logic level 1, a diversity reset signal $D_{RS}$ is generated, so that the counted value of the monitor timer 384 is reset to 0, and reception strength data RSS indicating the reception strength of the antenna $1_1$ is fetched into the reception strength register 389. Moreover, in response to the above described synchronization detection signal SYN of logic level 1, a diversity reset signal $D_{RS}$ of logic level 1 is supplied to the antenna selection circuit 383. As a result, the antenna selection circuit 383 inverts the logic level of the antenna selection signal $A_{SEL}$.

More specifically, the antenna selection circuit 383 supplies an antenna selection signal $A_{SEL}$ of logic level 1, which indicates the antenna $1_2$, to the antenna switch 2 and the AND gates 387 and 388. As a result, received data RD obtained by receiving in the antenna $1_2$ is supplied to the shift register 301 of the correlation detector 36 and the synchronization detector 37. In this case, if a synchronization pattern identical to the bit sequence shown in the synchronization pattern data SP appears in received data RD before the counted value of the monitor timer 384 reaches a time out value $T_{UP}$ as shown in FIG. the correlation detector 36 sends out a correlated synchronization detection signal CMP of logic level 1, and then the synchronization detector 37 sends out a synchronization detection signal SYN of logic level 1 in succession. A diversity reset signal $D_{RS}$ generated in response to the synchronization detection signal SYN of this logic level 1 resets the counted value of the monitor timer 384 to 0, and causes the reception strength. data RSS indicating the reception strength of the antenna $1_2$ to be fetched into the reception strength register 390.

In this case, the antenna selection circuit 383 selects a larger value between the value indicating the reception strength of the antenna $1_1$ fetched into the reception strength register 389 and the value indicating the reception strength of the antenna $1_2$ fetched into the reception strength register 390, and sends out an antenna selection signal $A_{SEL}$ having the logic level which instructs selection of the antenna according to the reception strength. Therefore, the antenna switch 2 selects one of the antennas $1_1$ and $1_2$, which is higher in reception strength, as an antenna for use in transmission and reception operation.

Further, as shown in FIG. 5, when the synchronization detection signal SYN of logic level 1, which indicates detection of synchronization, has been sent out total two times, the diversity control completion determination circuit 381 sends out a diversity completion signal DEN of logic level 1 which indicates completion of diversity control.

Thus, in the case where synchronization is normally established in the respective antennas $1_1$ and $1_2$ in the first attempt, a reception strength measurement step G1 which measures the reception strength of the antenna $1_1$ and a reception strength measurement step G2 which measures the reception strength of the antenna $1_2$ are performed in sequence as an antenna selection cycle in the diversity control as shown in FIG. 5. By this diversity control, one of the antennas $1_1$ and $1_2$, which is higher in reception strength is selected as an optimal antenna.

Figure 6:
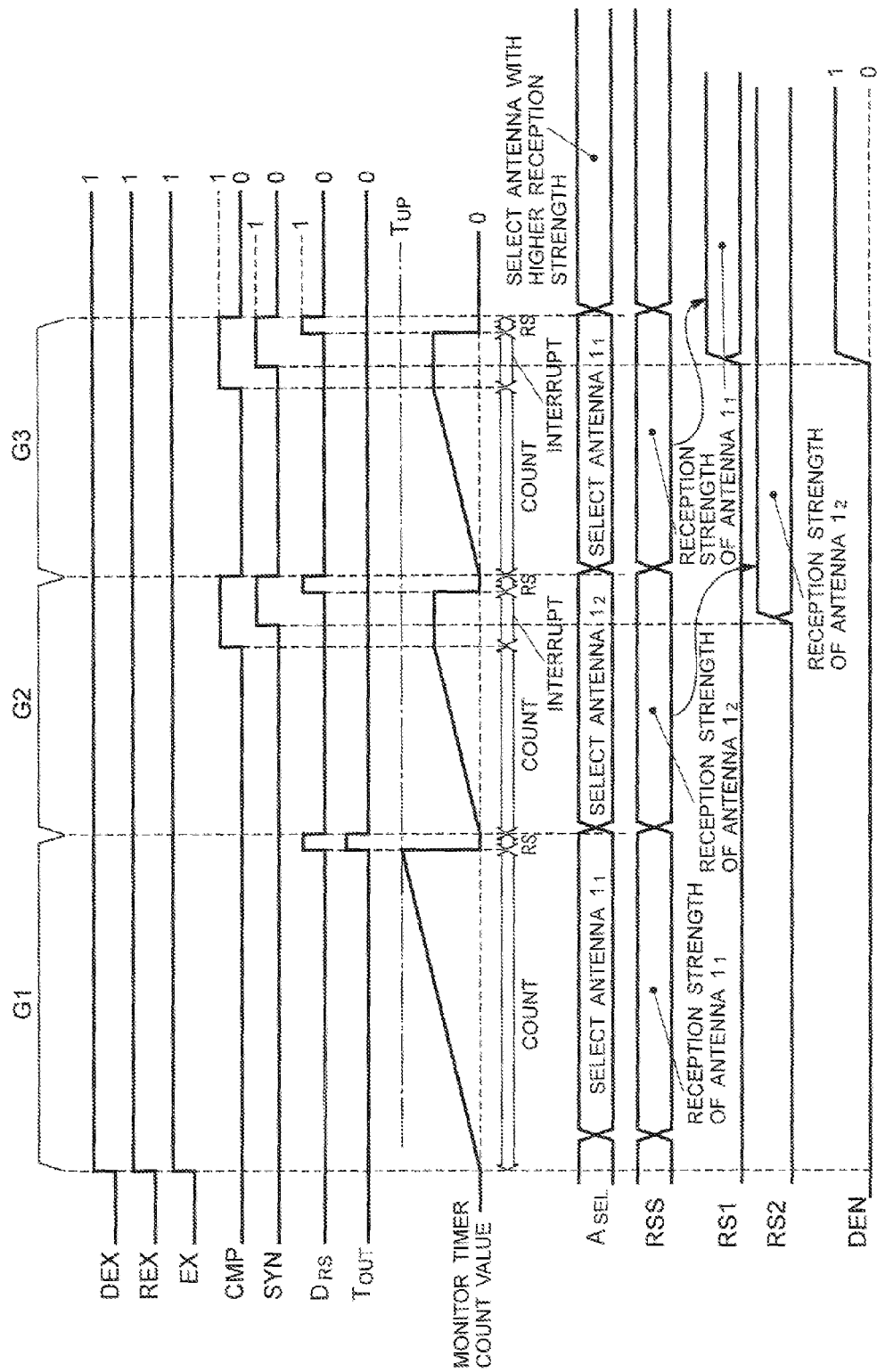
FIG. 6 is a time chart showing one example of the diversity operation in the case where synchronization cannot be established in the first attempt on the antenna $1_1$ side.

(2) The case where synchronization is not established on the antenna $1_1$ side in the first attempt First, the system control part 30 supplies a diversity execution instruction signal DEX and a reception instruction signal REX, each of which shifts from the state of logic level 0 to the state of logic level 1, to the diversity control part 38 as shown in FIG. 6. Consequently, the diversity execution signal EX of logic level 1 is supplied to the AND gate 382, and the monitor timer 384 starts the count-up operation. Further, the antenna selection circuit 383 supplies an antenna selection signal $A_{SEL}$ of logic level 0, which instructs selection of antenna by default, to the antenna switch 2 and the AND gates 387 and 388. As a result, received data RD obtained by receiving in the antenna $1_1$ is supplied to the shift register 301 of the correlation detector 36 and the synchronization detector 37. In this case, since the antenna $1_1$ has a poor receiving condition, the synchronization detector 37 cannot detect the synchronization pattern from the received data RD. In short, during this undetectable period, the synchronization detector 37 cannot generate a synchronization detection signal SYN of logic level 1 that indicates detection of synchronization. Since the synchronization detection signal SYN of logic level 1 is not supplied to the AND gate 387, the reception strength data RSS, indicating the reception strength value of the antenna $1_1$, is not fetched into the reception strength register 389. Further, since the synchronization detection signal SYN of logic level 1 is not sent out, so that the monitor timer 384 is not reset, the count operation in the monitor timer 384 continues. Consequently, the counted value reaches the time out value $T_{UP}$ as shown in FIG. 6, so that the monitor timer 384 sends out a time-out signal $T_{OUT}$ of logic level 1. As a result, a diversity reset signal $D_{RS}$ of logic level 1 is supplied to the antenna selection circuit 383, so that the antenna selection circuit 383 inverts the logic level of the antenna selection signal $A_{SEL}$.

Accordingly, the antenna selection circuit 383 supplies an antenna selection signal $A_{SEL}$ of logic level 1, which indicates the antenna $1_2$, to the antenna switch 2 and the AND gates 387 and 388. As a result, received data RD obtained by receiving in the antenna $1_2$ is supplied to the shift register 301 of the correlation detector 36 and the synchronization detector 37. In this case, if a synchronization pattern identical to the bit sequence shown in the synchronization pattern data SD appears in he received data RD before the counted value of the monitor timer 384 reaches a time out value $T_{UP}$ as shown in FIG. 6, the correlation detector 36 sends out a correlated synchronization detection signal CMP of logic level immediately before that point, and then the synchronization detector 37 sends cut a synchronization detection signal SYN of logic level 1 in succession. A diversity reset signal $D_{RS}$ generated in response to the synchronization detection signal SYN of logic level 1 resets the counted value of the monitor timer 384 to 0, and causes the reception strength data RSS, indicating the reception strength of the antenna $1_2$, to be fetched into the reception strength register 390. Moreover, in response to the above described synchronization detection signal SYN of logic level 1, a diversity reset signal $D_{RS}$ of logic level 1 is supplied to the antenna selection circuit 783. As a result, the antenna selection circuit 383 inverts the logic level of the antenna selection signal $A_{SEL}$.

Accordingly, the antenna selection circuit 383 supplies an antenna selection signal $A_{SEL}$ of logic level 0, which indicates the antenna $1_1$, to the antenna switch 2 and the AND gates 387 and 388. As a result, received data RD obtained by receiving in the antenna $1_1$ is supplied to the shift register 301 of the correlation detector 36 and the synchronization detector 37. In this case, if a synchronization pattern identical to the bit sequence shown in the synchronization pattern data SD appears in the received data RD before the counted value of the monitor timer 384 reaches a time out value $T_{UP}$ as shown in FIG. 6, the correlation detector 36 sends out a correlated synchronization detection signal CMP of logic level 1, and then the synchronization detector 37 sends out a synchronization detection signal SYN of logic level 1 in succession. A diversity reset signal $D_{RS}$ generated in response to the synchronization detection signal SYN of logic level 1 resets the counted value of the monitor timer 384 to 0, and causes the reception strength data RSS, indicating the reception strength of the antenna $1_1$, to be fetched into the reception strength register 389.

In this case, the antenna selection circuit 383 selects a larger value between the value indicating the reception strength of the antenna $1_1$ fetched into the reception strength register 389 and the value indicating the reception strength of the antenna $1_2$ fetched into the reception strength register 390, and sends out an antenna selection signal $A_{SEL}$ having the logic level which instructs selection of the antenna according to the reception strength. Therefore, the antenna switch 2 selects one of the antennas $1_1$ and $1_2$, which is higher in reception strength, as an antenna for use in transmission and reception operation.

Further, as shown in FIG. 6, when the synchronization detection signal SYN of logic level 1, which indicates detection of synchronization, has been sent out total two times, the diversity control completion determination circuit 381 sends out a diversity completion signal DEN of logic level 1 which indicates completion of diversity control.

As described in the foregoing, in the case where synchronization is not established on the antenna $1_1$ side in the first attempt, a reception strength measurement step G1 which measures the reception strength of the antenna $1_1$ and a reception strength measurement step G2 which measures the reception strength of the antenna $1_2$ are performed in sequence as an antenna selection cycle in the diversity control as shown in FIG. 6, followed by a reception strength measurement step G3 which measures the reception strength of the antenna $1_1$, in other words, when the reception strength of the antenna $1_1$ could not be measured because synchronization could not be established in the reception strength measurement step G1, the reception strength measurement step G1 is ended once and the reception strength measurement step G2 which measures the reception strength of the antenna $1_2$ is executed. Then, after the step G2, the reception strength measurement step G3 for measuring the reception strength of the antenna $1_1$ again is executed, When synchronization could not be established still in the reception strength measurement step G3, a reception strength measurement step G4 (not shown) is then performed after the step G3.

Thus, when a synchronization pattern could not be detected from the received data RS in the diversity control, the reception strength measurement step G must be repeatedly executed until synchronization can be established, which proportionally increases processing time and electricity consumed for diversity control.

Failure in detection of the synchronization pattern from the received data RS may be attributed to environmental factors such as a poor radio wave, condition and a wide communication range, as well as to a time interval between a timing of starting diversity control and a timing of receiving the synchronization pattern.

Figure 7:
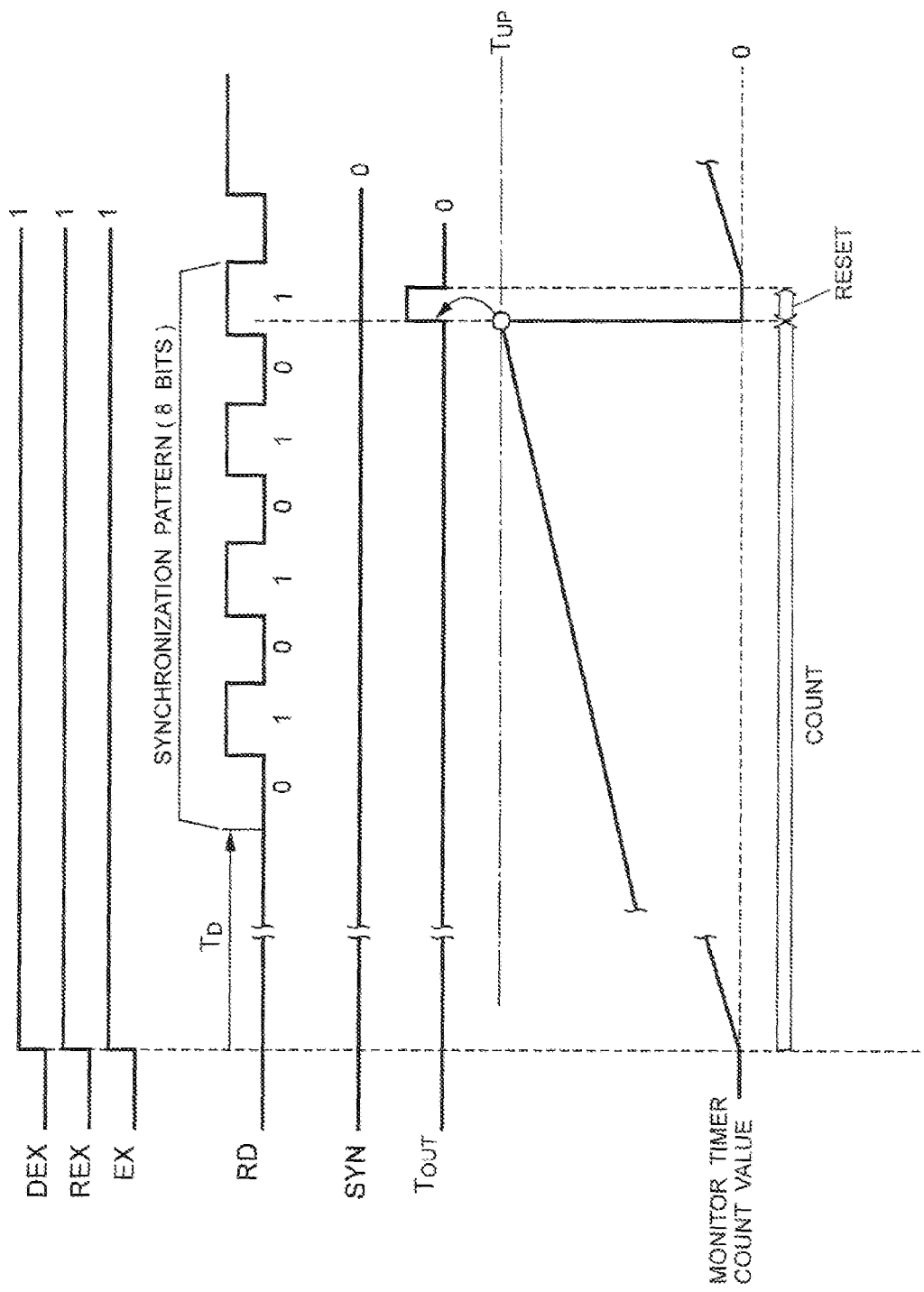
FIG. 7 is a time chart showing one example of the receiving timing of a synchronization pattern with which. the synchronization pattern cannot he detected from received data RS.

For example, as shown in FIG. 7, assuming that a bit sequence of 8 bits [01010101] starts to appear as a synchronization pattern one bit at a time in the received data RD after a time $T_D$ from supply of a diversity execution instruction signal DEX of logic level 1 from the system control part 30 to the diversity control part 38. In this case, according to the receiving timing shown in FIG. 7, the monitor timer 384 times out at the moment when the synchronization detector 37 determines synchronization of a bit sequence of the top 7 bits of the synchronization pattern in the received data sol. Therefore, although the bit sequence [01010101] of all the eight bits of the synchronization pattern is eventually appear in the received data RD after that moment, a synchronization detection signal SYN of logic level 1 is not sent cut as in the reception strength measurement step G1 shown in FIG. 6, and therefore acquisition of the reception strength cannot be achieved. As a consequence, the reception strength measurement step G for acquiring the reception strength needs to be executed again, which proportionally increases processing time and electricity consumed for diversity control.

Accordingly, in order to avoid such a situation, the wireless communication apparatus shown in FIG. 1 sends out a correlated synchronization detection signal CMP of logic level 1 at the moment when a bit sequence of top K bits (K<N), out of the synchronization pattern of N bits, appears in the received data RD, so as to interrupt the count operation of the monitor timer 384. As a consequence, the count operation of the monitor timer 384 is interrupted before all the bits of the synchronization pattern appear.

Figure 8:
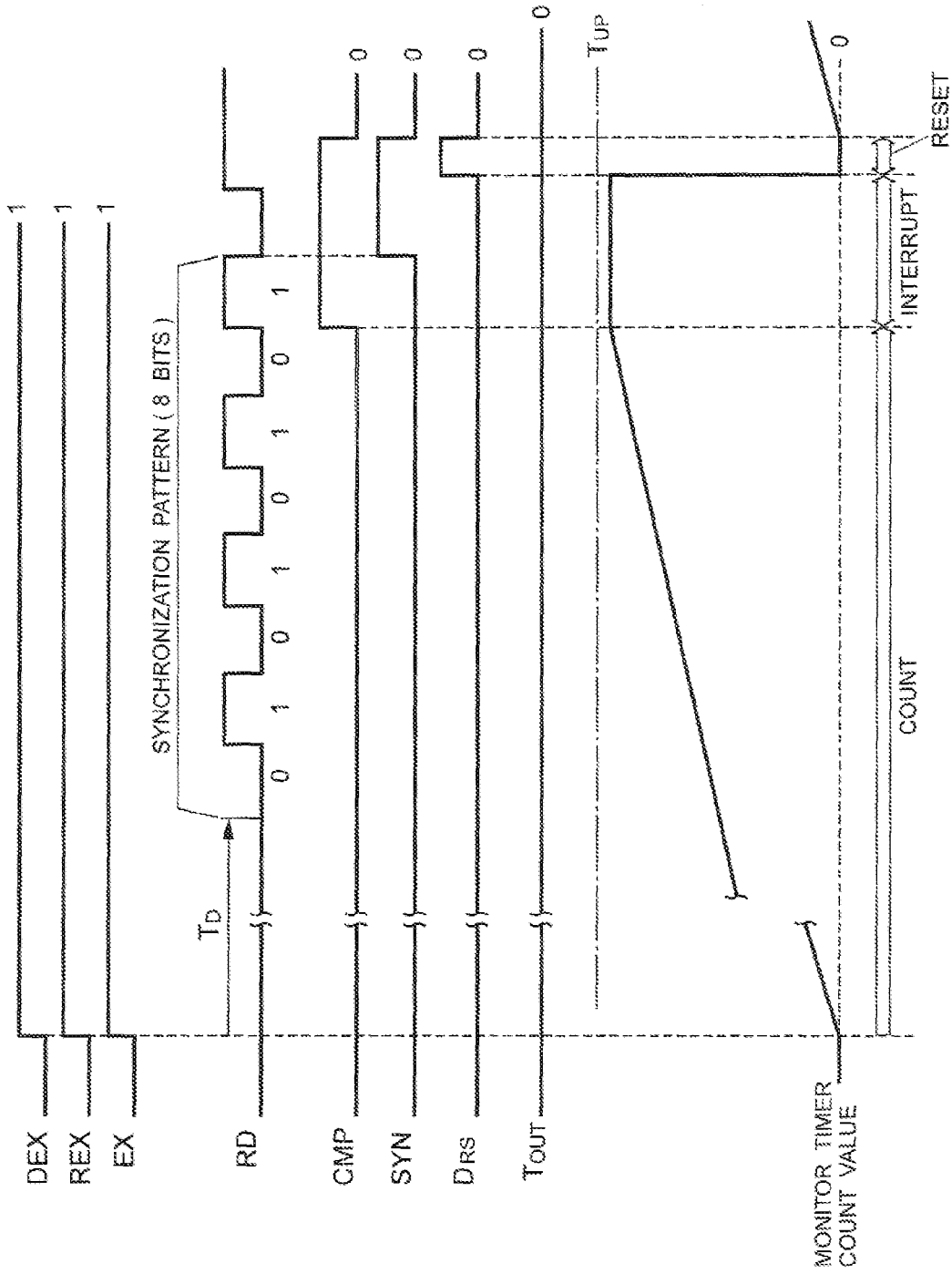
FIG. 8 is a time chart showing an operation of diversity control part 38 which can detect synchronization pattern with the receiving timing shown in FIG. 7.

Therefore, for example, when a sequence of 8 bits [01010101] appears as a synchronization pattern in the received data RD at the timing similar to the timing shown. in FIG. 7, a correlated synchronization detection signal CMP of logic level 1 is generated at the moment when part (7 bits) of the top its of the synchronization pattern in the received data RD has matched the synchronization pattern data SP as shown in FIG. 8. As a result, the count operation of the monitor timer 384 is interrupted. In other words, when a bit sequence that is part of the top bits in the synchronization pattern appears In the received data, there is a high possibility that the entire bit sequence of the synchronization pattern is eventually obtained. Therefore, at this point of time, the count operation of the monitor timer 384 is interrupted to avoid occurrence of time-out. Consequently, during this interruption, the entire bit sequence of the synchronization pattern is supplied to the synchronization detector 37, and therefore the synchronization detector 37 can generate a synchronization detection signal SYN of logic level 1 which indicates detection of synchronization as shown in FIG. 8, and thereby the reception strength, which serves as an index in selection of the antenna, can be obtained. This makes it unnecessary to repeatedly perform the reception strength measurement step G, so that the processing time taken for diversity control can be reduced and electricity consumption can be suppressed.

Although the synchronization pattern included in the received data RS is a unique pattern not for use in information data, a thermal noise generated due to heating of the wireless communication apparatus itself may have a waveform similar to the synchronization pattern. Accordingly, there is a possibility that synchronization detector 37 may erroneously detect a section of the received data RD, which is overlapped with a thermal noise, as a synchronization pattern. In that case, the level of the thermal noise is stored as the reception strength in the reception strength register (389, 390), which disables the antenna selection circuit 383 to correctly select the antenna.

Figure 9:
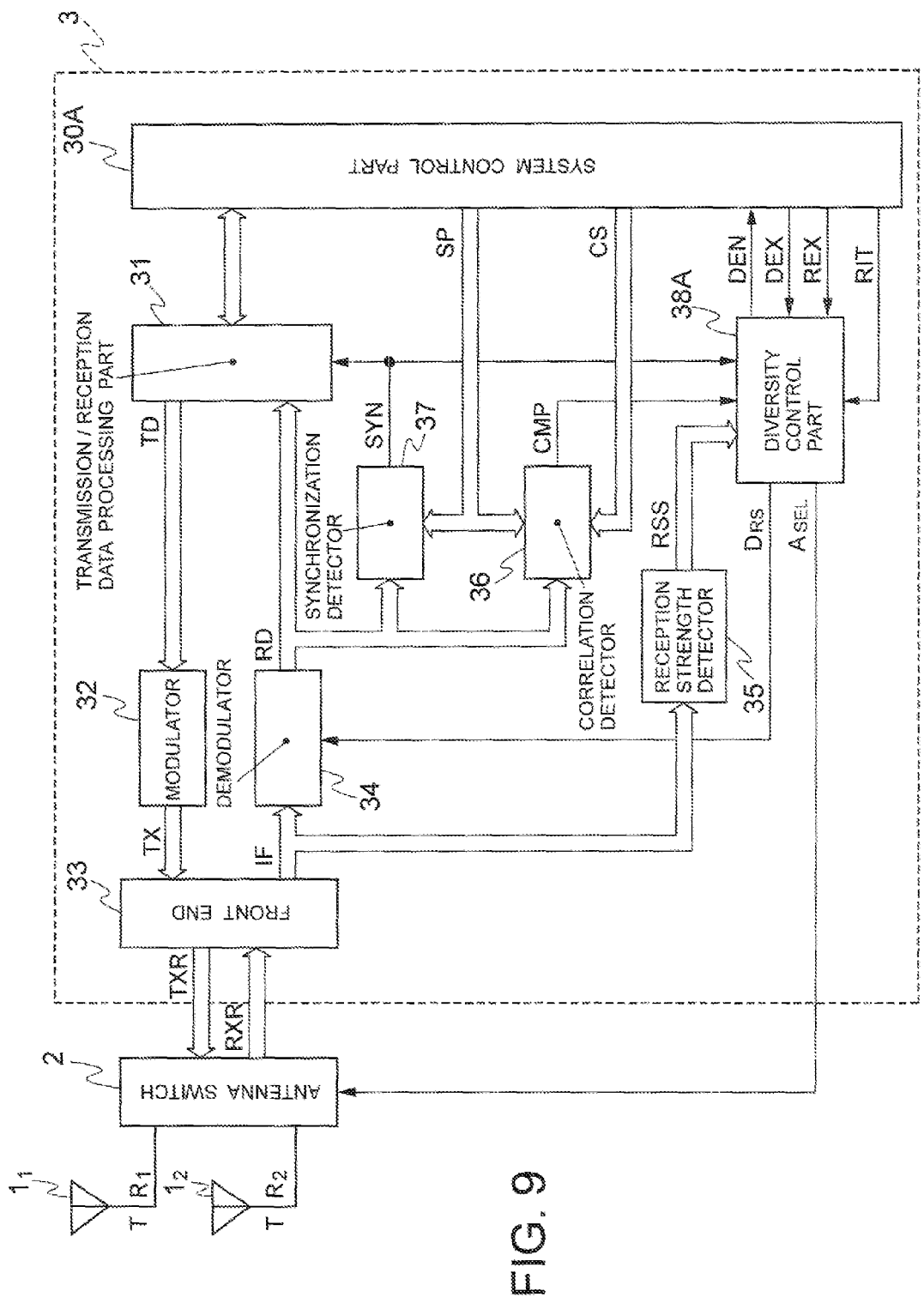
FIG. 9 is a block diagram showing another configuration of the wireless communication apparatus according to the present invention.

FIG. 9 is block diagram showing a modified example of the wireless communication apparatus shown in FIG. 1 modified to solve such a problem.

Note that the configuration shown in FIG. 9 is similar to the configuration shown in FIG. 1 except that the system control part 30 and the diversity control part 38 are replaced with a system control part 30A and a diversity control part 38A.

The system control part 30A supplies to the diversity control part 38A a reception strength threshold RIT in addition to the above described diversity execution instruction signal DEX and reception instruction signal REX. Note that the reception strength threshold RIT refers to a threshold for distinguishing whether a value indicated by the reception strength data RSS is obtained from actual reception of an electric wave or obtained due to the thermal noise. In short, the reception strength threshold RIT is a minimum value which can ascertain that the value indicated by the reception strength data RSS is acquired from reception of an electric wave.

FIG. 10 is a circuit diagram showing an internal configuration of the diversity control part 38A.

Note that the configuration shown in FIG. 10 is similar to the configuration shown in FIG. 4 except that a reception strength determination circuit 392 and an AND gate 393 are newly provided, and a correlated synchronization detection signal CMP is supplied to the AND gate 382 through the AND gate 393.

In FIG. 10, the reception strength determination circuit 392 determines whether or not a value shown by the reception strength data RSS is equal to or more than the reception strength threshold RIT. If the value is equal to or more than the reception strength threshold RIT, the reception strength determination circuit 392 supplies to the AND gate 393 a reception strength determination signal RJ of bob level 1, whereas if the value is smaller than the reception strength threshold RIT, the reception strength determination circuit 392 supplies a reception strength determination signal RJ of logic level 0. More specifically, if the value shown by the reception strength data RSS is smaller than the reception strength threshold RIT, the reception strength determination circuit 392 determines that the reception strength. data RSS is the data generated due to a thermal noise, and in this case, the reception strength determination circuit 392 supplies a reception strength determination signal RJ of logic level 0 to the AND gate 393. In other words, if the value shown. by the reception strength data RSS is the data generated due to the thermal noise, the reception strength determination circuit 392 supplies to the AND gate 393 a reception strength decision signal RJ of logic level 0 which instructs to invalidate the correlated synchronization detection signal IMP supplied from the correlation detector 36.

On the contrary, if the value shown by the reception strength data RSS is equal to or more than the reception strength threshold RIT, the reception strength determination circuit 392 determines that the reception strength data RSS is the data obtained by reception of an actual electric wave and, in this case, the reception strength determination circuit 392 supplies to the AND gate 393 a reception strength determination signal Rd of logic level 1 which instructs to validate the correlated synchronization detection signal CMP.

Only when the reception strength determination signal RJ indicates logic level 1, i.e., only when the reception strength data RSS is the data obtained by reception of an actual electric wave, the AND gate 393 supplies to the AND gate 382 the correlated synchronization detection signal CMP supplied from the correlation detector 36.

Therefore, according to the above described configuration, even when the received data RD includes a section overlapped with the thermal noise which has the same waveform as the synchronization pattern, the correlated synchronization detection signal CMP is invalidated. As a result, the monitor timer 384 times out as in the case of the reception strength measurement step G1 of FIG. 6. In this case, the reception strength signal RSS is not fetched into the reception strength register (389, 390), and a default value of 0 is maintained therein. Therefore, it is possible to prevent erroneous operation of fetching the signal level, relating to a thermal noise, into the reception strength register (389, 390) as the reception strength.

Although diversity control for selecting an optimal antenna is executed by hardware including the reception strength detector 35, the correlation detector 36, the synchronization detector 37, and the diversity control part 38 (38A) in the above embodiment, the diversity control may be executed by software.

For example, it is possible to make an unshown CPU (Central Processing Unit.) mounted on the system control part 30 (30A) execute the operations of the reception strength detector 35, the correlation detector 36, the synchronization detector 37, and the diversity control part 38 (38A).

FIG. 11 is a flow chart showing a diversity control routine executed by the CPU in response to a diversity execution instruction supplied from a system control part 30A.

In FIG. 11, first, the CPU starts the count operation of a built-in timer (not shown) (step S11). Next, the CPU writes "1", s the number of times of initial detection of the synchronization detection signal SYN, in a synchronization detection count register Q (not shown) (step S12). Next, the CPU supplies an antenna selection signal $A_{SEL}$, which indicates the antenna to be initially selected, to the antenna switch 2 (step S13). By the execution of step S13, a reception signal RXR acquired by receiving en electric wave with one of the antennas 1$_1$ and 1$_2$, which is indicated by the antenna selection signal $A_{SEL}$, is supplied to the front end part 33. Therefore, the front end part 33 sends out an intermediate frequency signal IF on the basis of the reception signal RXR. Further, the demodulator 34 demodulates the received data RD on the basis of the intermediate frequency signal IF. At this point, the CPU detects the reception strength on the basis of the amplitude of the intermediate frequency signal IF, and generates a reception strength signal which indicates the detected reception strength (step 514). Next, the CPU determines whether or not the received data RD includes the same bit sequence as that in the synchronization pattern data SP, which is made of a bit sequence of 8 bits, i.e., the CPU determines whether or not synchronization is detected (step S15). If it is determined that the received data RD includes the same bit sequence as that in the synchronization pattern data SP, i.e., if it is determined that synchronization is detected in step S15, the CPU generates a synchronization detection signal SYN (step S16). Then, the CPU stores the reception strength signal, which is generated in step 314, in the reception strength register (not shown) (step S17).

In step S15, if it is determined that the received data RD does not include the same bit sequence as that in the synchronization pattern data SP, i.e., if "no synchronization" is determined, then the CPU executes step S18 shown below. In step S18, the CPU determines whether or not the received data RD includes part of the synchronization pattern data SP which is made up of a bit sequence of 8 bits, part of the synchronization pattern data SP being, for example, a bit sequence of 7 bits out of the synchronization pattern data SP. In short, the CPU determines whether or not correlated synchronization is present (step S18).

If it is determined that correlated synchronization is present in step S18, the CPU sends out a correlated synchronization detection signal CMP (step S19). Then, the CPU determines whether or not the reception strength detected in step S14 is equal to or more than the reception strength threshold RIT (step S20). Note that the reception strength threshold RIT refers to, as described before, a threshold for distinguishing whether a value indicated by the reception strength data RSS is obtained from actual reception of an electric wave or obtained due to a thermal noise. In step P20, if it is determined that the reception strength detected in step S14 is less than the reception strength threshold RIT, then the CPU returns to execution of this step S14 and repeatedly executes the aforementioned operation. Contrary to this, if it is determined, in step S20 described above, that the reception strength detected in step S14 is equal to or more than the reception strength threshold RIT, then the CPU interrupts the above described count operation of the built-in timer (step S21). By the execution of step S21, the built-in time stops the count operation with the present counted value being maintained. Consequently, the built-in timer will not time out with the lapse of time. After the execution of step S21, the CPU determines whether or not the number of times of generation LP of the correlated synchronization detection signal CMP exceeds a prescribed number of times L (L being an integer) (step S22). If it is determined, in step S22 as described above, that the number of times of generation LP of the correlated synchronization detection signal CMP does not exceed the prescribed number of times L, then the CPU returns to execution of step S14 and repeatedly executes the aforementioned operation.

If it is determined that correlated synchronization is not present in step S18, then the CPU determines whether or not the counted value of the built-in timer is equal to a specified time out value, i.e., whether or not the built-in timer times out (step 323). If it is determined in step S23 described above that the timer has not timed out, then the CPU returns to execution of step S14 and repeatedly executes the aforementioned operation.

If it is determined in step S23 that the built-in timer times out, then the CPU sends out a time-out signal $T_{OUT}$ (step S24).

After execution of step S24 or step S17 described above, or in the case where the number of times of generation LP of the correlated synchronization detection signal CMP is determined to exceed the prescribed number of times L in step S22, the CPU resets the counted value of the built-in timer to a default value (step S25). Next, the CPU adds 1 to the value stored in the synchronization detection count register Q to obtain a new number of times of synchronization detection, and overwrites the previous value in the synchronization detection count register U with the new value (step S26). Next, the CPU determines whether or not the number of times of synchronization detection stored in the synchronization detection count register Q is larger than a sum total n (n being, an integer of 2 or larger) of the antennas ($1_1$, $1_2$), the sum total a being "2" for example (step S27). If it is determined that the number of times of synchronization detection stored in the synchronization detection count register Q in step S27 is not larger than the sum total n of the antennas ($1_1$, $1_2$), then the CPU supplies an antenna selection signal $A_{SEL}$, which instructs to switch the currently selected antenna to another antenna, to the antenna switch 2 (step S28). By the execution of step S28, a reception signal RXR acquired by receiving an electric wave with a newly switched antenna is supplied to the front end part 33. Therefore, the front end part 33 sends out an intermediate frequency signal IF on the basis of this reception signal RXR. Further, the demodulator 34 demodulates the received data RD on the basis of the intermediate frequency signal IF. After execution of step S28, the CPU returns to execution of step S14 and repeatedly executes the aforementioned operation. On the contrary, if it is determined that the number of times of synchronization detection stored in the synchronization detection count register Q in step S27 is larger than the sum total n of the antennas ($1_1$, $1_2$), then the CPU supplies to the antenna switch 2 an antenna selection signal $A_{SEL}$, which instructs selection of the antenna which could obtain the highest reception strength among the reception strength stored in the reception strength register (step 329). Then, the CPU sends out a diversity completion signal DEN, which indicates completion of diversity control, to the system control part 30 (step S30).

In this case, by a series of control operations from steps S14 to S28 shown in FIG. 11, the operation corresponding to one reception strength measurement step shown in FIGS. 5 to 7 is carried out.

Although the diversity control targets two antennas $1_1$ and $1_2$ in the foregoing embodiment, it is possible to similarly perform the above described diversity control on three or more antennas, i.e., n antennas (n being an integer of 2 or larger).

More specifically, in the present invention, first, the antennas ($1_1$, $1_2$) are alternatively selected (383, 328) one by one in every selection cycle (G1 to G3), while the reception strength data (RSS), which indicates the reception strength of each reception signal (RXR, IF, RD) acquired in every antenna, is obtained. In this operation, the reception strength data is retained in the reception. strength register (389, 390, S17) in association with each antenna at every timing of the synchronization signal which is sent out upon detection of the synchronization pattern in a reception signal (37, S16), and an antenna associated with the maximum value out of the values of the reception strength data is selected (383, S29) as an antenna for use in communication operation. In this retaining and selecting operation, the following control processing is performed. That is, when an approximation pattern (CMP) approximating to the synchronization pattern is detected in a reception signal, detection processing of the synchronization signal is continued (S20, S21, S14, S15) regardless of the above described selection cycle.

This makes it possible to solve the problem that acquisition of the reception strength is failed due to the antenna being switched to a next antenna during detection processing of the synchronization pattern that can normally be detected. Therefore, since it is not necessary to execute control for re-acquisition of reception strength of an antenna whose reception strength could not be acquired before, a shorter diversity control period and reduced electricity consumption can be achieved.

This application is based on Japanese Patent Application No 2012-144296 which is herein incorporated by reference.

What is claimed is:

1. A diversity control method for selecting any one of a plurality of antennas as a receiving antenna in selection cycles, the method comprising:
    a reception strength detection and retention step of alternatively selecting the antennas while retaining reception strength data indicating a reception strength of a reception signal which is acquired in each antenna, the reception strength data being retained in association with each of the antennas in accordance with a detection timing of a synchronization signal in the reception signal; and
    a selection step of selecting an antenna corresponding to the receiving strength data,
    the reception strength detection and retention step comprising:
        a step of determining detection of the synchronization signal upon arrival of data that matches a synchronization pattern included in the reception signal; and
        a synchronization detection continuation step of continuing, if an approximation pattern approximating to the synchronization pattern is detected in the reception signal, detection operation of the synchronization signal regardless of the selection cycle.

2. The diversity control method according to claim 1, wherein
    the synchronization detection continuation step is performed on condition that the reception strength at a time when the approximation pattern is detected is equal to or more than a prescribed strength.

3. The diversity control method according to claim 1, wherein
    the synchronization detection continuation step is continued until a number of times of detection of the approximation pattern exceeds a prescribed number of times.

4. The diversity control method according to claim 2, wherein
    the synchronization detection continuation step is continued until a number of times of detection of the approximation pattern. exceeds a prescribed number of times.

5. The diversity control method according to claim I, wherein
    the synchronization pattern is made of a bit sequence of N bits (N being an integer of 3 or more), and the approximation pattern is made of top K bits (K being an integer smaller than N) in the synchronization pattern.

6. The diversity control method according to claim 2, wherein
    the synchronization pattern is made of a bit sequence of N bits (N being an integer of 3 or more), and the approximation pattern is made of top K hits (K being an integer smaller than N) in the synchronization pattern.

7. The diversity control method according to claim 3, wherein
    the synchronization pattern is made of a bit sequence of N bits (N being an integer of 3 or more), and the approximation pattern is made of top K bits (K being an integer smaller than N) in the synchronization pattern.

8. The diversity control method according to claim 4, wherein
    the synchronization pattern is made of a bit sequence of N bits (N being an integer of 3 or more), and the approximation pattern is made of top K bits (K being an integer smaller than N) in the synchronization pattern.

9. A wireless communication apparatus, including a diversity control part configured to select any one of a plurality of antennas as a receiving antenna in selection cycles,
    the diversity control part comprising:
        an acquisition component which alternatively selects the antennas to selection cycles while acquiring a reception signal of each of the antennas;
        a reception strength detection component which generates reception strength data indicating reception. strength of the reception signal;
        a synchronization detector for detecting the synchronization signal upon arrival of data that matches a synchronization pattern included in the reception signal and for sending out a synchronization detection signal;
        a reception strength register for retaining reception strength data in association with each of the antennas in accordance with a timing of the synchronization detection signal in the reception signal;
        an optimal antenna selection component which selects an antenna on the basis of the reception strength data;
        a correlated synchronization detector for sending out a correlated synchronization detection signal if an approximation pattern approximating to the synchronization pattern is detected in the reception signal; and
        a synchronization detection continuation component which continues detection operation of the synchronization signal in response to the correlated synchronization detection signal regardless of the selection cycle.

10. The wireless communication according to claim 9, wherein
    the synchronization detection continuation component continues the detection operation of the synchronization signal if the reception strength at a time when the approximation pattern was detected is equal to or more than a prescribed strength.

11. The wireless communication apparatus according to claim 9, wherein
    the synchronization detection continuation component continues the detection operation of the synchronization signal until a number of times of detection of the approximation pattern exceeds a prescribed number of times.

12. The wireless communication apparatus according to claim 10, wherein
    the synchronization detection continuation component continues the detection operation of the synchronization. signal until a number of times of detection of the approximation pattern exceeds a prescribed number of times.

13. The wireless communication apparatus according to claim 9, wherein
    the synchronization pattern is made of a bit sequence of N bits (N being an integer of 3 or more), and the approximation pattern is made of top K bits (K being an integer smaller than N) in the synchronization pattern.

14. The wireless communication apparatus according to claim 10, wherein
the synchronization pattern is made of a bit sequence of N bits (N being an integer of 3 or more), and the approximation pattern is made of top K bits (K being an integer smaller than N) in, the synchronization pattern.

15. The wireless communication apparatus according to claim 11, wherein
the synchronization pattern is made of a bit sequence. of N bits (N being an integer of 3 or more), and the approximation pattern is made of top K bits (K being an integer smaller than NO in the synchronization pattern.

16. The wireless communication apparatus according to claim 12, wherein
the synchronization pattern is made of a hit sequence of N bits (N being an integer of 3 or more), and the approximation pattern is made of top K bits (K being an integer smaller than N) in the synchronization pattern.

\* \* \* \* \*